United States Patent Office 3,779,960
Patented Dec. 18, 1973

3,779,960
PROCESS FOR PRODUCING SYNTHETIC RUBBER LATEX HAVING HIGH POLYMER CONCENTRATION AND LOW VISCOSITY
Yoshihiko Araki and Hideo Hayashi, Yokohama, Japan, assignors to Nippon Oil Company Limited, Tokyo, Japan
No Drawing. Filed Dec. 28, 1971, Ser. No. 213,168
Claims priority, application Japan, Dec. 29, 1970, 46/121,056
Int. Cl. C08f 1/13, 1/84
U.S. Cl. 260—8
8 Claims

ABSTRACT OF THE DISCLOSURE

A process is disclosed for producing a synthetic rubber latex having relatively high polymer concentration and low viscosity by polymerizing aliphatic conjugated diolefins or mixtures of these diolefins and vinyl compounds in an emulsion polymerization system. The process is characterized by the use of certain non-ionic water-soluble polymeric colloids in prescribed amounts, which colloids exhibit perculiar effect upon the quality of resulting latex. The polymerization is further conducted in the presence of certain water-soluble metal salts which contribute for limited amounts to the production of high quality latexes contemplated by this invention.

This invention relates to the production of synthetic rubber latexes, more particularly to a process for producing latexes of the type having relatively high polymer concentration and relatively low viscosity.

More specifically, the invention is directed to a process for polymerizing aliphatic conjugated diolefins or a mixture of these diolefins and vinyl compounds in an emulsion polymerization system wherein the monomer to water ratio is held greater than unity.

Synthetic rubber latexes of high solid content find wide application for example in the manufacture of foam rubber, paints, adhesives and binders and in the surface finishing of paper and fabrics. Advantageously, such highly concentrated latexes can be transported with ease and with a minimum of cost. To suit these applications, the latex should be also desirably low in its viscosity. It is well recognized that the solid content of latex can be increased at a relatively low viscosity by increasing the particle size of polymer and improving its particle distribution pattern.

Heretofore, two typical methods have been proposed for obtaining synthetic rubber latexes of high concentration and low viscosity by increasing the particle size of the polymer. According to one such method, a latex of low polymer concentration and relatively small particle size is subjected to concentration to a desired level after or during cohesion of dispersed polymer particles by suitable physical or chemical treatment. This conventional method has the various difficulties that it is apt to entail production of large quantities of coagulated materials which are economically objectionable; expensive and nonreclaimable additives are required which would adversely affect the purity of latex; and costly additional equipments are needed.

The other known method produces a latex having high polymer concentration by polymerizing highly concentrated monomers, viz with the ratio of monomer to water held greater than unity, in the presence of a small amount of emulsifiers. While this method does not require any special costly equipment or large quantities of additives, it is reported to be not entirely acceptable in view of the fact that the reproducibility of uniform quality polymers is rather difficult to achieve and that the polymerization time is prolonged.

Whereas, it is the primary object of this invention to provide an improved process for producing synthetic rubber latexes of high polymer concentration and low viscosity, without involving the above-noted difficulties of the conventional processes.

This and other more specific objects and features of the invention will appear clear from the detail description which follows with reference to certain preferred embodiments of the invention and from the appended claims.

Briefly stated, the desired latexes according to one aspect of the invention can be obtained by the process of polymerizing aliphatic conjugated diolefins or a mixture of these diolefins and vinyl compounds in an emulsion polymerization system containing a soap of fatty acids, rosin soap or a mixture thereof as an emulsifier; wherein the ratio by weight of said monomer or monomer mixture to water is held at from 0.8 to 1.5, preferably from 1.0 to 1.25, and the polymerization is carried out at a temperature between 40° and 80° C. in the presence of at least one of the non-ionic water-soluble polymeric colloids which have a molecular weight of at least $10^3$ of which at least $2 \times 10^{-5}$ grams per 100 grams of water are dissolvable at room temperature and which are selected from the group consisting of gelatin, causticized starch, polyacrylic amide, polyoxyethylene, polyvinyl alcohol and polyvinylmethyl ether, said colloids being added in an amount of 0.00001 to 0.1 part, by weight preferably 0.0001 to 0.01 part by weight per 100 parts of said monomers.

According to another aspect of the invention, the polymerization process just described is further conducted in the presence of a water-soluble salt of one or more metals selected from the group consisting of magnesium, calcium, zinc, strontium, cadmium and barium, said water-soluble metal salt being added in an amount of $1 \times 10^{-5}$ to $1 \times 10^{-3}$ moles as metal ions per 100 parts monomer. Two or more of these water-soluble metal salts may be combined, but importantly the total amount thereof should not depart from the specified range of from $1 \times 10^{-5}$ to $1 \times 10^{-3}$ moles.

A remarkable advantage of the present invention is found in the employment of the above two types of additives which contribute in only very small amounts to the production of a latex of high polymer concentration and low viscosity with excellent reproducibility. It has now been found that these additives are free from adversely affecting the purity of latex or the properties of product polymer made from such latex. It has also been found to advantage that the synthetic rubber latex made available by the practice of the invention contains at least 1 weight percent or more of polymer having a particle size of greater than 0.8 micron.

It will be understood to those skilled in the art that highly concentrated latex has an acceptable particle size distribution attributable to closely controlled rate of polymer particles coated by soap and to cohesion of latex particles having limited stability in the polymerization system in the presence of certain electrolytes. However, it is considered ordinarily difficult to obtain a latex of large particle size at reasonable yield by maintaining latex particles intermediate between stable and unstable in the polymerization system over prolonged length of time and without entailing the production of economically objectionable coagulated materials from cohesion of excess latex particles. This necessarily leads to poor reproducibility of quality polymer.

It has now been ascertained that certain water-soluble polymeric colloids are peculiarly effective in only limited amounts to retain restricted stability of polymer particles in the system and are thus conducive to the production of a latex having relatively large particle size. The amount of polymeric colloids to be added to the polymerization system is critically important and should not depart from the range of from 0.00001 to 0.1 part per 100 parts monomer. Less amounts are literally ineffective, while greater amounts tend to retard the rate of polymerization and entail the side-production of objectionable non-latex type solid polymers.

As previously stated, the present invention further contemplates the use of certain water-soluble metal salts which have been found conducive to stability of latex particles and particularly to better particle size distribution of the resulting latex, although the reason for this is not precisely known. The amount of these metal salts to be added to the polymerization system is also important and should be in the range of from $1 \times 10^{-3}$ moles as metal ions per 100 parts monomer. Less amounts do not serve the purpose of the invention, while greater amounts tend to give considerable quantities of objectionable coagulated materials and adversely affect the quality of latex product. The term water-soluble metal salt is intended to collectively embrace calcium chloride, calcium bromide, calcium nitrate, calcium acetate, calcium formate, zinc chloride, zinc nitrate, strontium chloride, strontium bromide, strontium acetate, cadmium nitrate, cadmium formate, barium chloride, barium bromide and barium acetate.

The term non-ionic water-soluble polymeric colloids denotes naturally occurring or synthetic polymeric colloids having $10^3$ or greater molecular weights and including $2 \times 10^{-5}$ grams or more per 100 grams water dissolvable at room temperature, typically such as gelatin, caustized starch, polyacrylic amide, polyoxyethylene, polyvinyl alcohol and polyvinylmethyl ether.

Experiments have indicated that non-ionic water-soluble polymeric colloids with less molecular weight than $10^3$ fail to serve the purpose of the invention and with less solubility than $2 \times 10^{-5}$ grams per 100 grams water cannot be dispersed uniformly in the water phase of the polymerization system.

The amounts of these polymeric colloids to be added should be regulated generally in accordance with their molecular weights, and are usually smaller the larger the molecular weight where similar types of these colloids are employed.

It will be understood that the type and quantity of each of the monomers, emulsifiers, modifiers and initiators may be chosen to suit the properties and end-use of a latex desired.

The monomer which may be employed in accordance with the invention includes aliphatic conjugated diolefins such as butadiene, isoprene or mixtures thereof and mixtures of aliphatic conjugated diolefins alone with or mixtures of these diolefins with one or more of vinyl compounds such as styrene, alpha-methylstyrene, divinylbenzene, acrylonitrile, acrylic acid, methacrylic acid and their esters such as n-butylacrylic acid ester.

The ratio of the monomers or mixtures thereof to water which is usually ion-exchanged water or boiler condensation water, should be in the range of from 0.8 to 1.5, preferably from 1.0 to 1.25. Higher ratios tend to give a latex of high gel content, while lower ratios will produce less concentrated latex.

The emulsifier according to the invention includes alkali metal salts of higher fatty acids having from 8 to 20 carbon atoms per molecule such as sodium caprate, sodium laurate, potassium oleate; ammonium salts such as ammonium stearate; amine salts; alkali metal salt of rosin acid; and mixtures thereof. The rosin acid includes dehydrogenated rosin acid, hydrogenated rosin acid and disproportionated rosin acid. Effective amounts of these emulsifiers in the practice of the invention are as small as 1–2 parts per 100 parts monomer, particularly during early stage of polymerization.

The modifier according to the invention includes mercaptans such as n-dodecylmercaptan and t-dodecylmercaptan, diisopropyl-xanthogen, sulfur and carbon tetrachloride.

The polymerization initiator suitable for the process of the invention includes persulfates such as potassium persulfate and ammonium persulfate. Alternatively, these may be combined with a suitable reducing agent such as sodium thio-sulfate to serve as redox catalyst.

The polymerization reaction temperature depends upon the rate of polymerization desired. It should be above 30° C., preferably about 40°–80° C., and may be varied while the polymerization is in progress.

The order of adding the water-soluble polymeric colloids and water-soluble metal salts is optional, and they may be added alone or together after the polymerization has been initiated, preferably when the polymerization has progressed to a rate not exceeding 40%.

The process of this invention may be continuous or batchwise, whichever is more convenient.

The invention will be further described by way of the following examples which are given for purposes of illustration and not in the limiting sense.

All parts that appear in the comparative and inventive examples below are by weight unless otherwise noted.

COMPARATIVE EXAMPLES 1–2

75 parts butadiene, 25 parts styrene, 1 part potassium rosinate, 0.3 part n-dodecylmercaptan and 0.3 part potassium persulfate were charged into a glass-lined autoclave equipped with stirrer, and the polymerization was initiated at 45° C. The temperature was increased progressively in the manner disclosed by Whitby in "The Synthetic Rubber," page 649. When the conversion of butadiene reached 60%, there was added a "booster" consisting of a modifier, initiator and emulsifier described by Smith et al. in "The Indian Rubber World" Vol. 113, page 814 (1946) which booster more specifically consists of 0.05 part n-dodecylmercaptan, 0.05 part potassium persulfate, 0.75 part potassium oleate and 5 parts water. The polymerization was thus continued at 65° C. for 58 hours. There was further added 1.25 parts potassium oleate dissolved in 6 parts water. Unreacted monomers were removed, and the resulting latex was examined. This experiment was conducted twice under similar conditions with the results given in Table 1.

TABLE 1

| Comparative Examples | 1 | 2 |
|---|---|---|
| Reaction time (hrs.) | 68 | 68 |
| Total solid (percent) | 58.9 | 61.5 |
| Viscosity (cps.)[1] | 600 | 3,850 |
| Coagulated material | Some | None |

[1] Determined by Brookfield Viscometer at 25° C. in accordance with ASTM D1417-61. Same applies to the comparative and inventive examples hereinafter given.

It is apparent from Table 1 above that the polymerization conditions employed in these comparative examples cannot produce a latex with good reproducibility of high polymer concentration and low viscosity.

COMPARATIVE EXAMPLES 3–6

The procedure of Comparative Example 1 was followed except that predetermined amounts of sodium alginate and sodium sulfate were added upon initiation of the polymerization, with the results given in Table 2.

TABLE 2

| Comparative Examples | 3 | 4 | 5 | 6 |
|---|---|---|---|---|
| Sodium alginate (parts) | 0.001 | 0.002 | 0.001 | |
| Sodium sulfate (parts) | 0.1 | | 0.1 | |
| Potassium chloride (parts) | | | | 0.2 |
| Reaction time (hrs.) | 70 | 68 | 71 | 73 |
| Solid content (percent) | 56.3 | 56.5 | 60.3 | |
| Viscosity (cps.) | 120 | 200 | 590 | |
| Coagulated material | (¹) | (²) | Some | (³) |

¹ Large amounts.
² Solid polymers.
³ All coagulated.

As evidenced by the above data, undesirable non-latex type polymers would be produced when sodium sulfate or sodium alginate, neither being contemplated by this invention, is used alone. It is also noted that the use of sodium alginate together with sodium sulfate or potassium chloride fails to give a desired quality latex of high polymer concentration but rather gives rise to the production of undesirable coagulated materials.

Inventive Example 1

The procedure of Comparative Example 1 was followed except that the additives shown in Table 3 were added at the start of the polymerization. The results of similar runs of experiment are also shown in Table 3.

Particle size distribution [2] (percent):

Microns:
- 0.1 or less _____ 5
- 0.1–0.2 _____ 13
- 0.2–0.3 _____ 18
- 0.3–0.4 _____ 10
- 0.4–0.8 _____ 25
- 0.88 or above _____ 29

[1] Determined in accordance with the method suggested by Maron et al. in Analytical Chemistry, vol. 25, section 7, page 1087 (1953).
[2] Determined by the creaming method disclosed by Schmidt et al. in Rubber Chemistry and Technology, vol. 34, page 433 (1961).

TABLE 3

| Run number | 1 | 2 | 3 | 4 | 5 |
|---|---|---|---|---|---|
| Type of water-soluble polymeric colloid | Gelatin | Gelatin | Gelatin | Polymerization degree 500 PVA | Polymerization degree 500 PVA.[1] |
| Amount of same (parts) | 0.2 | 0.01 | 0.01 | 0.001 | 0.0005. |
| Type of water-soluble metal salt | | | | MgSO$_4$ | MgSO$_4$. |
| Amount of same (parts) | | | | 0.02 | 0.02. |
| Solid content (percent) | 4.7 | 59.9 | 60.2 | 59.5 | 56.8. |
| Viscosity (cps.) | | 300 | 290 | 200 | 200. |
| Coagulated material | Solid polymer | None | None | None | None. |

[1] PVA: Denotes polyvinyl alcohol.

The above test data indicate that a latex of high concentration and low viscosity can be obtained with good reproducibility by the practice of this invention, only except for Run No. 1 wherein the water-soluble polymeric colloid was used in excess of the specified amounts resulting in the formation of some coagulated materials.

Inventive Example 2

The procedure of Inventive Example 1 was followed except for the use of the additives shown in Table 4 and with the results also shown.

TABLE 4

| Run number | 6 | 7 | 8 | 9 |
|---|---|---|---|---|
| Type of water-soluble polymeric colloid | Polyacrylic amide | Polyvinylmethyl ether | Polyvinylmethyl ether | Polyoxyethylene. |
| Amount of same (parts) | 0.001 | 0.01 | 0.005 | 0.002. |
| Type of water-soluble | ZnCl$_2$ | | BaCl$_2$ | CaBr$_2$. |
| Amount of same (parts) | 0.02 | 0.004 | 0.04. | |
| Solid content (percent) | 59.5 | 60.1 | 59.8 | 57.9. |
| Viscosity (cps.) | 230 | 300 | 290 | 200. |
| Coagulated material | None | None | None | None. |

Inventive Example 3

75 parts butadiene, 25 parts styrene, 52 parts water, 1 part disproportionated sodium resinate, 0.3 part t-dodecylmercaptan, 0.3 part potassium persulfate, 0.005 part polyvinylmethyl ether and 0.02 part zinc sulfate were charged into a glass-lined autoclave equipped with stirrer. The polymerization was initiated at 50° C. The temperature was increased to 65° C. as the polymerization progressed to a rate of 45%. The reaction was continued for 10 hours in the presence of at this temperature the booster identified in Comparative Example 1. Thereafter, 1.5 parts potassium oleate dissolved in 10 parts water was added. Total polymerization time was 68 hours. The resulting latex was examined for its properties as tabulated below.

TABLE 5

- Total solid (percent) _____ 59.5
- Viscosity (cps.) _____ 190
- Mechanical stability [1] (percent) _____ 0

The above test data indicate that a latex of low viscosity and having high concentration of large polymer particles can be produced by the process of the invention. It is also to be noted that the latex thus obtained contain a relatively low content of electrolytes and is highly stable in spite of small quantities of emulsifier present. It therefore finds suitable application for example in the formation of films and as starting latex for ABS resin.

Repeated cycles of experiments following the procedures of inventive examples illustrated herein above have produced synthetic rubber latexes of substantially identical quality.

What is claimed is:

1. In a process for producing a synthetic rubber latex by polymerizing in an aqueous medium at least one aliphatic conjugated diolefin or a mixture of aliphatic conjugated diolefins and at least one vinyl compound in the presence of a fatty acid soap, rosin soap or a mixture thereof, wherein the ratio by weight of monomer to water is from 0.8 to 1.5, the improvement which comprises adding to the polymerization system at least one non-ionic water-soluble polymeric colloid of molecular weight at least $10^3$ and of solubility at least $2 \times 10^{-5}$ grams per 100 grams of water at room temperature and which is selected from the group consisting of gelatin, causticized starch, polyacrylic amide, polyoxyethylene, polyvinyl alcohol and polyvinylmethyl ether, said colloid being added in an amount of 0.00001 to 0.1 part by weight per 100 parts by weight monomer and allowing the polymerization to take place at temperatures ranging between 30° and 80° C.

2. The process as claimed in claim 1 which further comprises adding at least one water-soluble salt of a metal in an amount of $1 \times 10^{-5}$ to $1 \times 10^{-3}$ moles as metal ions per 100 parts monomer, said metal being selected from the group consisting of magnesium, calcium, zinc, strontium, cadmium and barium.

3. The process according to claim 1 wherein a modifier is added, which is selected from the group consiting of n-dodecyl mercaptan, t-dodecyl mercaptan, diisopropyl xanthogen, sulfur and carbon tetrachloride.

4. The process according to claim 1 wherein an initiator is added.

5. The process according to claim 4 wherein said initiator is a persulfate.

6. The process according to claim 5 wherein a reducing agent is added to said persulfate.

7. The process according to claim 2 wherein said colloid and said metal salt are added to the polymerization system after the polymerization has progressed to a point not exceeding 40%.

8. The process according to claim 1 wherein said latex contains at least 1 percent by weight of polymer of particle size greater than 0.8 micron.

References Cited
UNITED STATES PATENTS

| | | | |
|---|---|---|---|
| 3,049,502 | 8/1962 | Howland et al. | 260—17.4 |
| 2,430,591 | 11/1947 | Stewart | 260—17.4 |

WILLIAM H. SHORT, Primary Examiner

P. F. KULKOSKY, Assistant Examiner

U.S. Cl. X.R.

260—29.7 R